United States Patent [19]
Mitrovic

[11] Patent Number: 5,983,021
[45] Date of Patent: Nov. 9, 1999

[54] DYNAMICALLY SWITCHING STATICALLY BOUND FUNCTION CALLS TO DYNAMICALLY BOUND FUNCTION CALLS WITHOUT RECOMPILATION

[75] Inventor: Srdjan Mitrovic, Redwood City, Calif.

[73] Assignee: Sun Microsystems, Palo Alto, Calif.

[21] Appl. No.: 09/085,223

[22] Filed: May 27, 1998

[51] Int. Cl.$^6$ .................................................. G06F 9/45
[52] U.S. Cl. ...................... 395/705; 395/710; 707/101; 709/305
[58] Field of Search ...................... 395/705, 710, 395/708; 707/101, 100; 709/305; 712/233, 220

[56] References Cited

U.S. PATENT DOCUMENTS

| | | | |
|---|---|---|---|
| 5,339,430 | 8/1994 | Lundin et al. | 709/305 |
| 5,579,518 | 11/1996 | Yasumatsu | 395/705 |
| 5,748,963 | 5/1998 | Orr | 395/704 |
| 5,872,973 | 2/1999 | Mitchell et al. | 790/305 |

OTHER PUBLICATIONS

Adaptive Optimization for Self: Reconciling High Performance with Exploratory Programming, Stanford University, Aug. 1994.

*Primary Examiner*—Tariq R. Hafiz
*Assistant Examiner*—Tuan Q. Dam
*Attorney, Agent, or Firm*—Finnegan, Henderson, Farabow, Garrett & Dunner, L.L.P.

[57] ABSTRACT

An improved hybrid dynamic-binding system for switching between static binding and dynamic binding of function calls provides static binding for function calls when the function is unambiguous, and when the function becomes ambiguous at runtime, this system switches to dynamic binding, without recompiling the code of the function call, thus improving performance over conventional systems. The system performs this functionality by inserting a placeholder into a statically bound function call so that when the statically bound function call needs to be converted to a dynamically bound function call, the placeholder can be overwritten to perform the conversion without having to recompile the code.

24 Claims, 5 Drawing Sheets

DYNAMICALLY SWITCHING STATICALLY BOUND FUNCTION CALLS TO DYNAMICALLY BOUND FUNCTION CALLS WITHOUT RECOMPILATION

FIELD OF THE INVENTION

The present invention relates generally to data processing systems and, more particularly, to dynamically switching, statically bound function calls to dynamically bound function calls without recompilation.

BACKGROUND OF THE INVENTION

When a programmer develops a computer program, the source code of the program typically accesses many functions and variables within the program. These accesses are expressed in the source code as mere references to the names of the functions or variables. However, some time before the functions and variables can be accessed, the name must be bound to the memory location where either the entry point of the function or the data for the variable resides. This binding can be performed in two ways: statically or dynamically. The phrase "static binding" refers to binding the name to the memory location during compilation or linking. In contrast, the phrase "dynamic binding" refers to binding the name to the memory location at runtime.

The technique of dynamic binding has become quite popular in object-oriented programming languages. When developing a program in an object-oriented language, a programmer typically creates a number of objects whose interactions perform the functionality of the program. An "object" contains both data and behavior. The data is stored as data members of the object, and the behavior is performed by function members or methods of the object. Dynamic binding has become popular in object-oriented languages because dynamic binding provides great flexibility to the programmer. For example, dynamic binding facilitates polymorphism, where a function name may denote several different function members depending on the runtime context in which it is used. It is common in object-oriented programming languages for one function name to be used by more than one function. In fact, this feature is basic to most object-oriented programming languages.

One function name may refer to more than one function because each object in a program is based upon a class definition (i.e., an object is an instance of a class). Classes are typically linked together to form a class hierarchy, where one class, a derived class, may inherit the data members and function members of another class, a base class. In such situations, the derived class may either choose to use the implementation of the function members provided by the base class, or it may choose to override the function members. When overriding a function member, the derived class defines its own implementation for that function member using the same function name. After the derived class overrides a function member of a base class, when objects of type "derived class" call the function member, the implementation of the function member provided by the derived class is invoked. Conversely, when objects of type "base class" call the function member, the implementation of the function member provided by the base class is invoked.

Although it provides flexibility when programming, dynamic binding can detract greatly from runtime performance if not performed efficiently, for the overhead associated with dynamic binding is incurred each time a function member is invoked. Therefore, if the dynamic binding scheme employed is inefficient, performance of the overall program may degrade substantially.

One conventional scheme for performing dynamic binding, known as in-line caching, is fairly efficient. In the in-line caching scheme, each function member has two entry points: a verified entry point and an unverified entry point. The verified entry point provides access to the actual code of the function member, the code developed by the programmer. The unverified entry point, on the other hand, provides access to system-provided verification code used to verify that the caller actually intended to invoke this function member as opposed to a different, similarly named function member having a different implementation. In the in-line caching scheme, a function call (e.g. "foo") by a caller object comprises two instructions as shown below in Intel I486 pseudo-code:

CODE TABLE 1 move eax, class
call unverified_entry_point class.foo

In the above code table, "class" is an identifier of the class of the last object to have invoked the foo function member via this code. That is, objects of different types may have used this code to invoke the function member, and the "class" identifies the class of the most recent object to have done so. The move instruction moves the "class" identifier into the eax register of the computer, and the call instruction accesses the unverified entry point of the foo function member for the identified class. This call instruction is made in the hope that the class of the caller object is the same as the class contained in the eax register to save processing time, which will be further described below.

Figure 1:
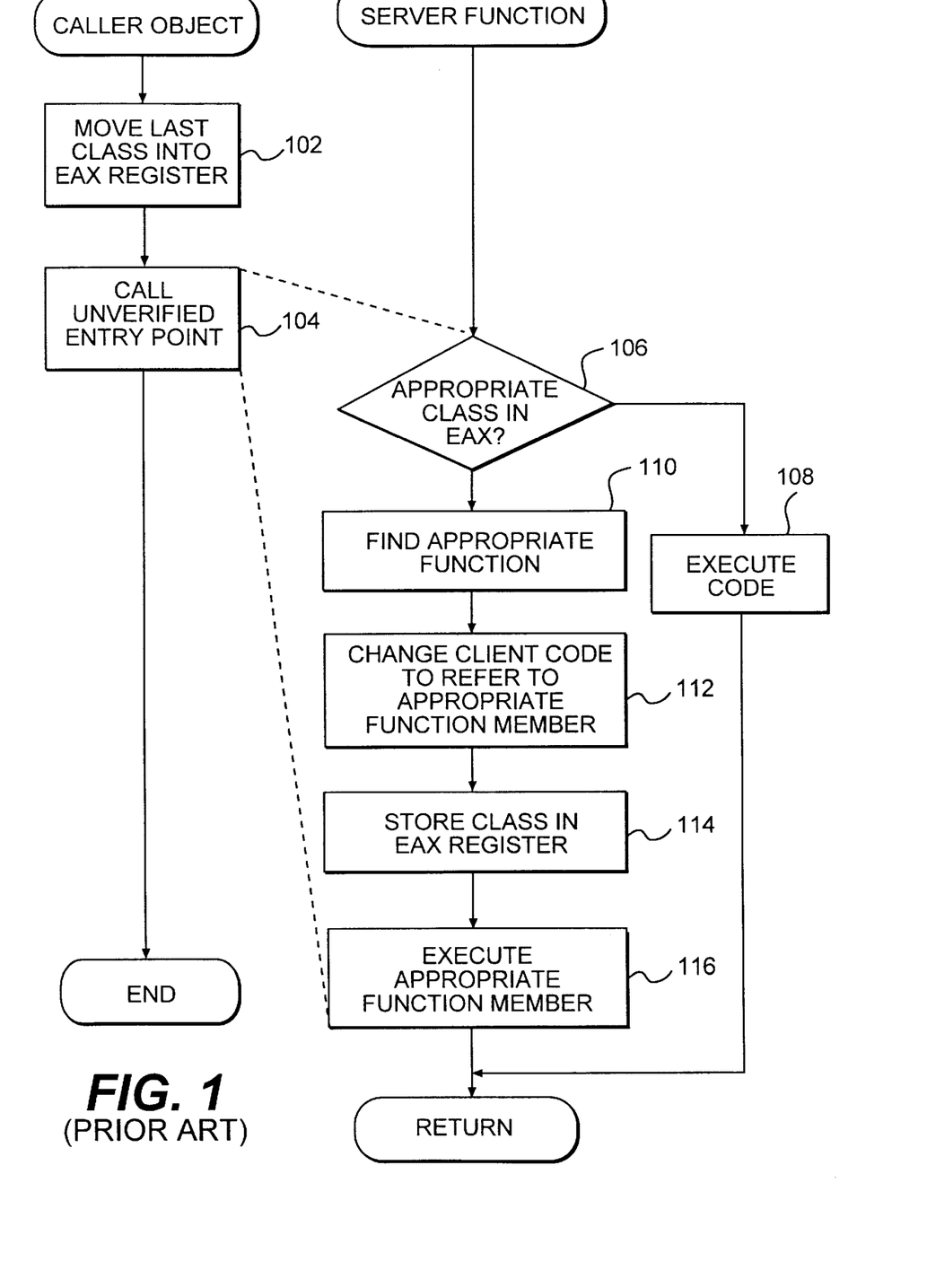
FIG. 1 depicts a flowchart of the steps performed by a conventional in-line caching technique.

To explain the in-line caching technique more completely, FIG. 1 contains a flowchart of the steps performed by a conventional in-line caching technique. Specifically, this flowchart depicts the steps performed by a caller object when executing a function call to invoke a function member, a server function. When executing the function call, the caller object executes instructions like the ones contained in Code Table #1. The first step performed by the caller object is for the caller object to execute a move instruction to move the class of the last object that used the function call to invoke this server function into the eax register (step 102). This instruction has been described above.

Next, the caller object calls the unverified entry point of the server function (step 104). This instruction has also been described above. When this instruction is executed, the unverified entry point of the server function is accessed and the verification code located at the unverified entry point is executed as reflected by steps 106, 110, 112, 114, and 116. This verification code determines if the server function is the correct function member to be invoked by the caller object. If not, it determines the correct function member, modifies the code of the function call (contained in Code Table #1) so that the correct function member is invoked for subsequent invocations of the function call, and then invokes the correct function member.

The first step performed by the verification code of the server function is to determine if the appropriate class is in the eax register (step 106). The class in the eax register is the class of the last object to have used the function call to invoke this function member. As such, it can be ensured that the server function is the appropriate function to be invoked for all objects of the class contained in the eax register. In determining if the class in the eax register is the appropriate class, the verification code of the server function compares this class with the class of the caller object. The class of the caller object is passed into the server function as a hidden parameter, and in this step, the server function uses this parameter for the comparison. If the appropriate class is contained in the eax register, then the server function has determined that it is the correct function to be invoked and the instructions contained within it are then executed (step 108). These instructions are located at the verified entry point of the server function. The instructions executed in this step are the actual code developed by the programmer for the server function.

Otherwise, if the appropriate class is not in the eax register, the verification code of the server function accesses the hidden parameter, indicating the class of the caller object, and utilizes a look-up function to locate the appropriate function for objects of this class (step 110). The look-up function is a system-provided function. After locating the appropriate function, the verification code then changes the code of the function call reflected by step 102 to refer to the class of the caller object so that this class will be moved into the eax register the next time the function call is invoked. and the verification code also changes the code of the function call reflected by step 104 so that it will invoke the unverified entry point of the appropriate server function the next time it is invoked (step 112). The verification code of the server function then stores the appropriate class in the eax register (step 114) and invokes the verified entry point of the appropriate server function (step 116). The verified entry point, at which the main code of the function member is located, may be invoked because it has been determined that this function member is the appropriate one for the caller object. After executing the appropriate function member, processing returns.

Although changing the code to refer to the appropriate function member is a necessary part of the in-line caching scheme, it takes a significant amount of processing time, because the instruction cache of the CPU has to be flushed. In some CPU architectures, like the Intel Pentium architecture, the CPU maintains an instruction cache containing instructions prefetched from main memory to reduce the number of main memory accesses. When an instruction changes, the cache is no longer valid, so it has to be flushed and main memory must be accessed to fill the cache again. Both flushing and filling the instruction cache take a great deal of processing time.

Although in-line caching is a fairly efficient way of performing dynamic binding, it performs a significant amount of unnecessary processing. For example, the verification code of a function member needs to be invoked only when the function name of that function member is ambiguous, referring to more than one function member within the class hierarchy. When there is only one function member of a given name in the class hierarchy, all references to this function member name can only refer to that one function member—no ambiguity exists. In this situation, invoking the verification code causes wasteful processing. In response to this observation, one conventional system has implemented a hybrid approach to dynamic binding that uses both static and dynamic binding. Using this approach, static binding is utilized for function members that are unambiguous, and at runtime when a statically bound function member becomes ambiguous because it has been overridden, this system switches to dynamic binding. As a result, this system reduces the unnecessary invocation of the verification code when a function is unambiguous.

Figure 2A:
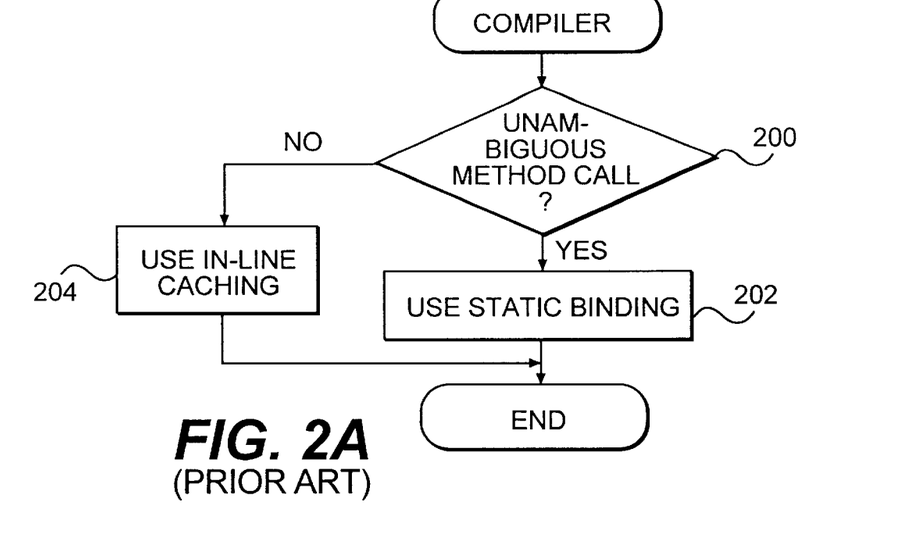
FIG. 2A depicts a flowchart of the steps performed by a compiler when compiling a function call using a conventional hybrid static-binding and dynamic-binding function call system.

This hybrid system is implemented in two parts. The first part of the system is implemented in the compiler, and the second part of the system is performed by the program at runtime. When compiling a function call, the compiler, as shown in FIG. 2A, first determines if this is an unambiguous function call (step 200). The compiler makes this determination by examining the class hierarchy to determine if there are any function members with the same name. If the function call is unambiguous, the compiler compiles the code using static binding (step 202). In this situation, the compiler compiles the source code of the function call into a call into the verified entry point of the function member. If, on the other hand, the function member is ambiguous, the compiler compiles the function call so as to use the in-line caching scheme described above (step 204).

Figure 2B:
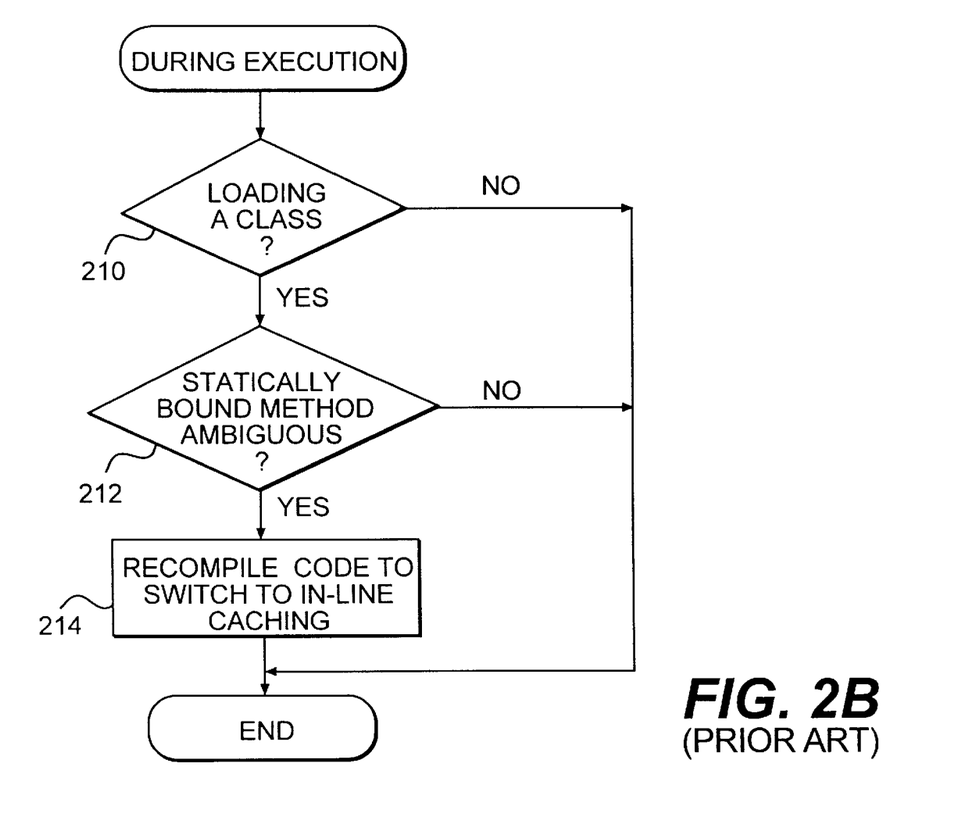
FIG. 2B depicts a flowchart of the steps performed by the computer program output by the compiler of FIG. 2A when switching between a statically bound function call to a dynamically bound function call.

After the program has been compiled, the program may be executed, and during execution, as shown in FIG. 2B, the system determines when a system-provided function has been invoked to load a class (step 210). The phrase "loading a class" refers to an object being instantiated based upon a class definition. Such a creation of an object may override a function member in the class hierarchy, thus making the function member ambiguous. If the system determines that a class is being loaded, the system determines if a statically bound function member becomes ambiguous (step 212). The system makes this determination by determining if a function member of the loaded class overrides an existing function member in the class hierarchy that was compiled in step 202 of FIG. 2A to use static binding. If this condition is true, the system recompiles the code for the function call to switch to in-line caching (step 214). In this step, the function call code has to be recompiled to add the instructions shown above in code table #1.

Although this hybrid system saves the needless invocation of verification code, it introduces a heavy burden on the system: the recompilation of code to switch between static binding and dynamic binding. Having to recompile the code causes the instruction cache to be flushed, main memory to be accessed, and the code to be parsed and generated. It is therefore desirable to improve hybrid dynamic-binding systems.

SUMMARY OF THE INVENTION

An improved hybrid dynamic-binding system for switching between static binding and dynamic binding of function calls provides static binding for function calls when the corresponding function is unambiguous. At runtime, when the function becomes ambiguous, this system switches to dynamic binding without recompiling the code of the function call, thus improving performance over conventional systems. The system performs this functionality by inserting a placeholder (i.e., reserving space) into a statically bound function call so that when the statically bound function call needs to be converted to a dynamically bound function call, the placeholder can be overwritten to perform the conversion without having to recompile the code.

A method in a computer system consistent with this invention compiles a computer program into object code. The computer program has functions containing code and function calls of the functions. This method determines when a function call is unambiguous. When the function call is unambiguous, the function call is compiled to generate object code that performs static binding, and a placeholder is inserted into the generated object code so that an instruction can be inserted into the placeholder at runtime of the generated object code to switch to dynamic binding when the function call becomes ambiguous.

A method consistent with the present invention is provided in a computer system having a computer program with statically bound function calls and dynamically bound function calls. The statically bound function calls invoke unambiguous functions and the dynamically bound function calls invoke ambiguous functions. This method determines whether at least one of the statically bound function calls becomes ambiguous. When it is determined that at least one of the statically bound function calls becomes ambiguous, the method converts the at least one statically bound function call into a dynamically bound function call by backpatching the statically bound function call such that the conversion occurs without recompilation of the computer program.

A data processing system consistent with the patent invention is provided. The data processing system has a memory and a processor. The memory contains a compiler for determining when a function call is ambiguous and for compiling the function call using static binding when the compiler determines that the function call is unambiguous. The program has a runtime library that determines at runtime when a statically bound function call becomes ambiguous and that converts the statically bound function call to a dynamically bound function call when it determines that the statically bound function call becomes ambiguous. The processor runs both the compiler and the program.

DETAILED DESCRIPTION OF THE INVENTION

Systems consistent with the present invention provide an improved hybrid dynamic-binding system by performing static binding for function calls when the function member is unambiguous and by switching to dynamic binding when the function member becomes ambiguous. This switching is performed without recompiling the code of the function call and, as such, significantly improves performance over conventional systems.

In one embodiment, when the compiler determines that a function call is unambiguous and may be optimized into a statically bound function call, the compiler inserts the instruction necessary to perform static binding. This instruction represents a call into the verified entry point of the function member. Additionally, the compiler inserts a placeholder into the code of the function call, reserving sufficient space for an instruction to be added later in the event that the statically bound function call has to be switched to a dynamic-binding call using in-line caching. This placeholder reserves space for a single instruction so that at runtime when the exemplary embodiment determines that a statically bound function call needs to be converted to in-line caching, the exemplary embodiment can backpatch an instruction over the placeholder and modify the existing instruction to switch to the in-line caching scheme. Accordingly, this switch occurs without recompiling the code, thus saving significant processing time over some conventional systems.

Figure 3:
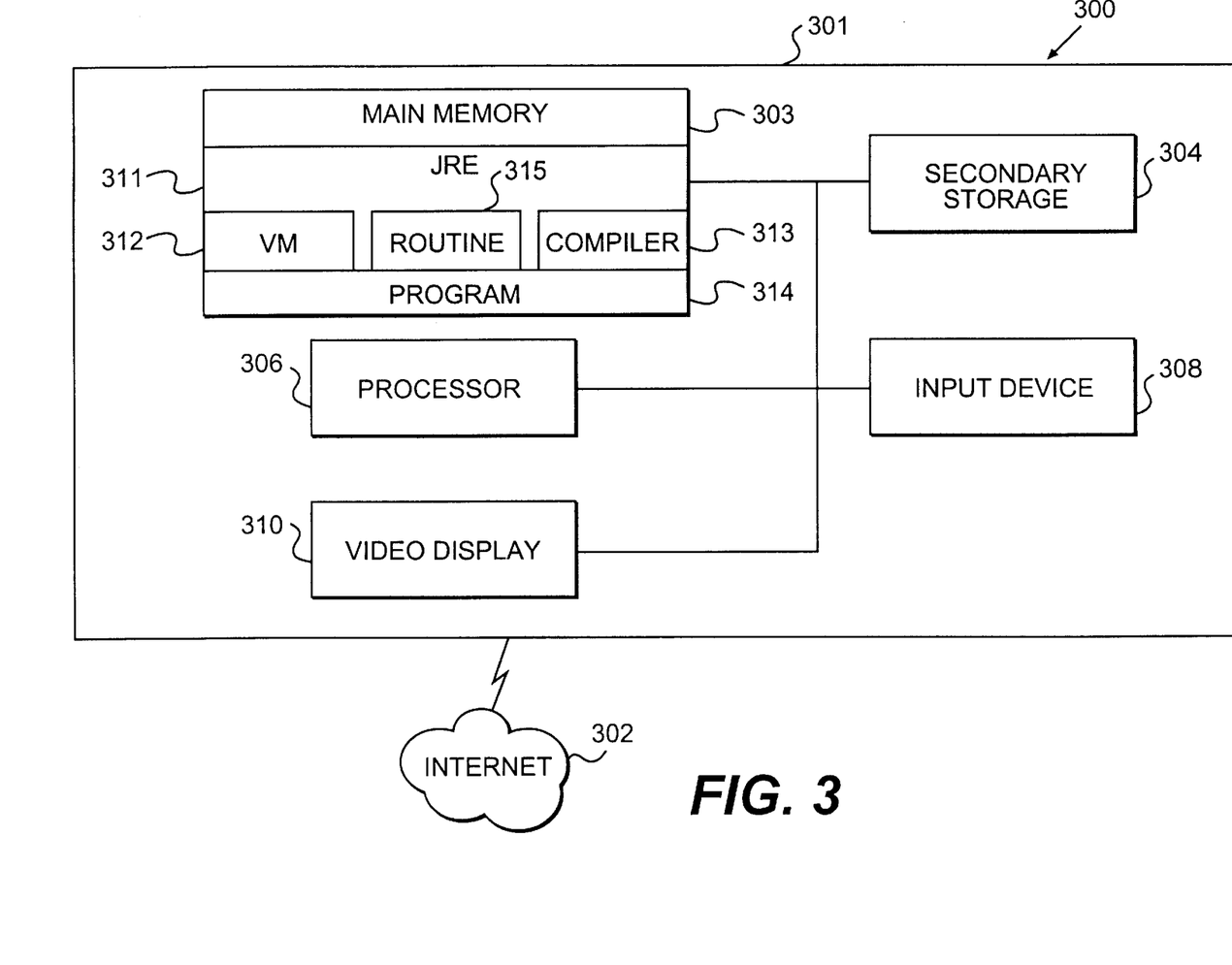
FIG. 3 depicts a data processing system suitable for practicing methods consistent with the present invention.

FIG. 3 depicts a data processing system 300 suitable for practicing an exemplary embodiment of the present invention. Data processing system 300 includes a computer system 301 connected to the Internet 302. Although the computer system 301 is depicted as being connected to the Internet 302, one skilled in the art will appreciate that the computer system may instead be connected to other networks, such as other wide area networks or local area networks. Computer system 301 contains a main memory 303, a secondary storage device 304, a processor 306, an input device 308, and a video display 310. Main memory 303 contains a Java runtime environment 311 that includes a Java™ Virtual Machine 312 that interprets program 314 and in some circumstances uses a compiler 313 to compile part of the program and improve runtime performance.

The Java™ Virtual Machine 312 also includes a runtime library 315 containing various functions utilized by programs during execution. The Java™ Virtual Machine is described in greater detail in Lindholm and Yellin, *The Java Virtual Machine Specification*, Addison-Wesley, 1997, and the runtime library 315 is described in greater detail in Jaworski, *Java 1.1 Developer's Guide*, Sams.net, 1997, at pp. 218–457, which are both hereby incorporated by reference. Various aspects of the exemplary embodiment of the present invention are found in both the compiler 313 and the runtime library 315, which are otherwise standard products. Specifically, the compiler 312 inserts the placeholder into the object code of a statically bound function call when compiling the program 314, and at runtime, the runtime library 315 performs the switch between static binding and dynamic binding without recompiling the function call.

One skilled in the art will appreciate that although one embodiment is described as being practiced in a Java™ environment, systems and methods consistent with the present invention may also be practiced in an environment other than a Java environment. Also, although aspects of one embodiment are depicted as being stored in memory 303, one skilled in the art will appreciate that systems and methods consistent with the present invention may be stored on other computer-readable media, such as secondary storage devices, like hard disks, floppy disks, and CD-ROM; a carrier wave received from the Internet 302; or other forms of ROM or RAM. Finally, although specific components of data processing system 300 have been described, one skilled in the art will appreciate that a data processing system suitable for use with the exemplary embodiment may contain additional or different components. Sun, Sun Microsystems, the Sun Logo, Java, and Java-based trademarks are trademarks or registered trademarks of Sun Microsystems Inc. in the United States and other countries.

Figure 4A:
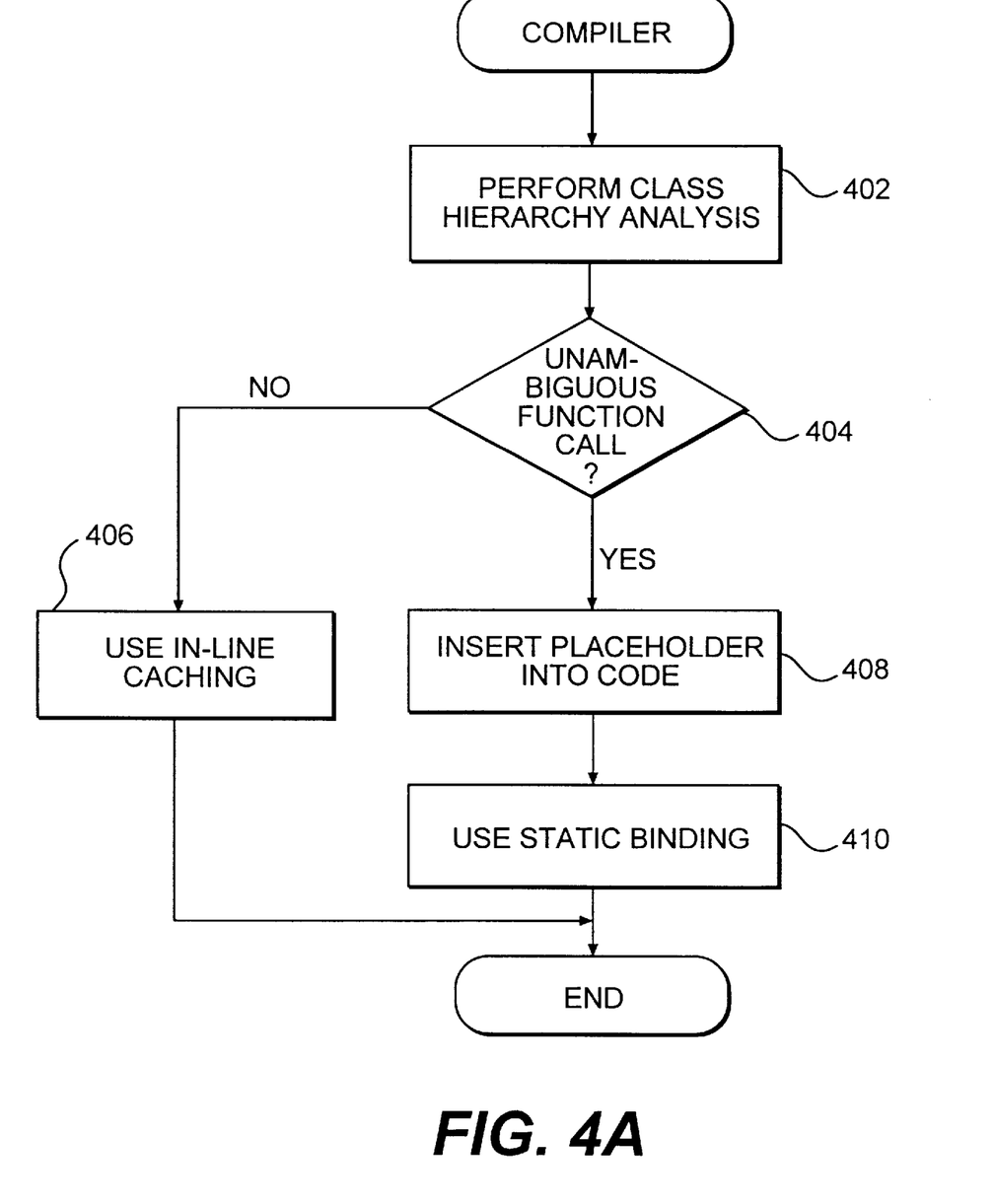
FIG. 4A depicts a flowchart of the steps performed by the compiler depicted in FIG. 3 when compiling a function call.

FIG. 4A depicts a flowchart of the steps performed by the compiler 313 of the exemplary embodiment of the present invention when compiling a function call. When compiling a function call, the compiler first performs class hierarchy analysis (step 402). In this step, the compiler analyzes the class hierarchy to determine whether this function member is ambiguous (i.e., named more than once).

The compiler then examines the results of the class hierarchy analysis and determines whether the function call is unambiguous (step 404). If the function call is ambiguous, the compiler compiles the function call by creating object code containing the appropriate in-line caching statements described previously (step 406). One skilled in the art will appreciate that other instructions can be used. Otherwise, the compiler inserts a placeholder into the object code (step 408). In this step, the compiler inserts the following instruction:

move eax, null

This instruction has the effect of moving "null" into the eax register, which is a harmless operation. Then, the compiler inserts the appropriate instruction into the object code to perform static binding (step 410). In this step, the compiler inserts the following static binding statement to invoke the verified entry point of the function:

call verified_entry_point

After either using in-line caching or using static binding, the function call has been compiled and processing finishes.

Figure 4B:
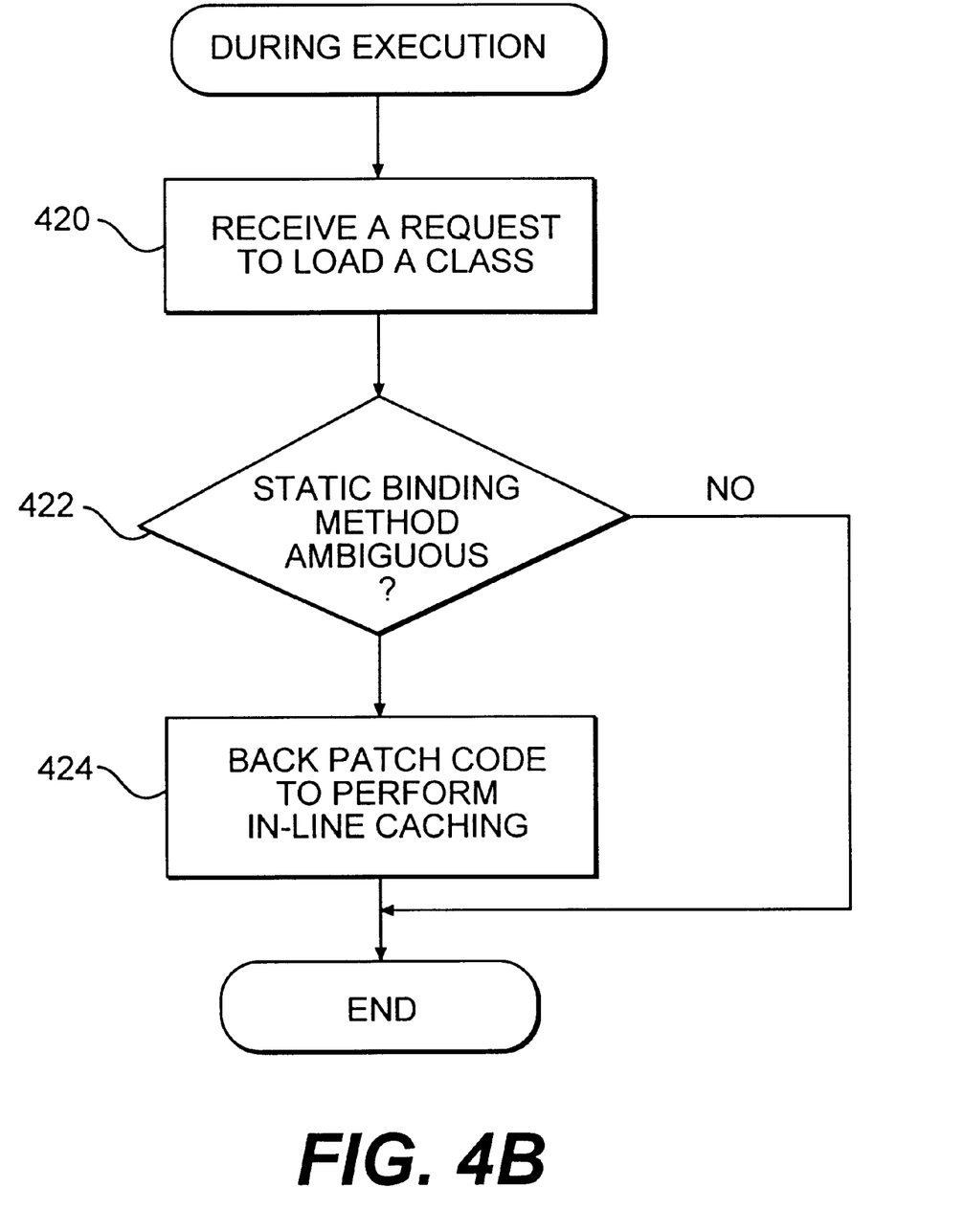
FIG. 4B depicts a flowchart of the steps performed by the runtime library of FIG. 3 when switching from a statically bound function call to a dynamically bound function call.

FIG. 4B depicts a flowchart of the steps performed by the runtime library 315 to switch from static binding to dynamic binding. At runtime, the runtime library, running with the computer program, receives a request to load a class from the program (step 420). In the Java™ environment, the program issues such a request by invoking the "Load Class" function of the Java™ Runtime Library. When a class is being loaded, the runtime library determines whether a function member is being added to the class hierarchy that would render ambiguous an already-existing function member previously compiled to use static binding (step 422). If so, the runtime library backpatches an instruction over the place holder and modifies the existing instruction to perform in-line caching for each function call of this function in the program (step 424). In this disclosure, the term backpatching refers to modifying the code after compilation to change the functionality of the code without recompilation. For example, where "foo" is the function member, the compiler 313 generated the object code for a statically bound function call using the two instructions shown below in Code Table # 2:

CODE TABLE 2 move eax, null
call verified_entry_point foo

After switching to in-line caching, the place holder, the move instruction, is backpatched, and the call instruction is modified so that the function call appears as shown below in Code Table #3:

CODE TABLE 3 move eax, class
call unverified_entry_point class.foo

In this example, "class" refers to the class containing the foo function member before it became ambiguous. In this manner, the code is backpatched to perform dynamic binding using in-line caching without having to recompile the code.

Systems and methods consistent with the present invention represent an improvement over conventional systems for switching between static binding and dynamic binding. Specifically, these systems and methods insert a place holder into a statically bound function call when compiled. And at runtime, when the ftmction referred to by the function call becomes ambiguous, these systems and methods switch the function call to use in-line caching by merely backpatching the code, thus avoiding recompilation.

While systems and methods consistent with the present invention have been described with reference to a preferred embodiment thereof, those skilled in the art will know of various changes in form and detail which may be made without departing from the spirit and scope of the present invention as defined in the appended claims and their full scope of equivalents.

What is claimed is:

1. A method in a data processing system having a computer program, a compiler for compiling the computer program into object code, and a class loader for loading a class, the method comprising the steps of:

compiling a function call from the computer program to generate object code for the function call, the compiling step comprising the substeps of
performing class hierarchy analysis to determine whether the function call is unambiguous in that it refers to a single function, the single function having a verified entry point,
inserting a placeholder into the object code for the function call when the compiler determines that the function call is unambiguous, and
inserting into the object code for the function call an instruction that accesses the verified entry point of the single function when the compiler determines that the function call is unambiguous;

starting execution of the object code and invoking the class loader to load the class;

determining, by the class loader, whether the function call of the computer program becomes ambiguous responsive to the class being loaded; and backpatching the function call in the object code to perform dynamic binding by the class loader when the class loader determines that the function call becomes ambiguous.

2. The method of claim 1, wherein the function has an unverified entry point into verification code, wherein the computer program has a plurality of functions, and wherein the compiling step further includes the step of inserting into the object code for the function call in-line caching instructions that access the unverified entry point of one of the plurality of functions when the compiler determines that the function call is ambiguous because it refers to more than one of the plurality of functions.

3. The method of claim 1, wherein the backpatching step includes the step of backpatching the object code of the function call to perform in-line caching.

4. The method of claim 3, wherein the step of backpatching the object code to perform in-line caching includes the step of storing an indication of the class into a register of the data processing system.

5. The method of claim 3, wherein the step of backpatching the object code further includes the step of backpatching the object code of the function call to access an unverified entry point of the one function.

6. A method for compiling a computer program into object code, the computer program having functions containing code and function calls to the functions, the method comprising the steps of:

determining when a function call is unambiguous; and compiling the function call to generate object code that performs static binding and inserting a placeholder into the object code for an instruction to be inserted into the placeholder to switch to dynamic binding when it is determined that the function call is unambiguous.

7. The method of claim 6, wherein the step of determining includes the step of performing class hierarchy analysis.

8. A method in a computer system having a computer program with statically bound function calls and dynamically bound function calls, the statically bound function calls invoking unambiguous functions and the dynamically bound function calls invoking ambiguous functions, the method comprising the steps of:

determining whether a statically bound function call becomes ambiguous at runtime of the computer program; and converting the statically bound function call into a dynamically bound function call when it is determined that the statically bound function call becomes ambiguous, and backpatching the statically bound function call such that the conversion occurs without recompilation of the computer program.

9. The method of claim 8, wherein the converting step includes the substep of converting the statically bound function call into in-line caching.

10. The method of claim 8, wherein the method further includes the step of determining when a class is being loaded; and wherein the step of determining whether the statically bound function call becomes ambiguous includes the step of determining whether the statically bound function call becomes ambiguous when it is determined that the class is being loaded.

11. The method of claim 10, wherein the class has class functions with names, wherein the statically bound function calls have names, and wherein the step of determining whether the statically bound function call becomes ambiguous further includes the step of determining whether the name of one of the class functions is similar to the name of one of the statically bound function calls.

12. A data processing system comprising:

a processor; and and memory containing:

means for causing the processor to compile a function call by determining when the function call is unambiguous and for causing the processor to compile the function call using static binding when the compiler determines that the function call is unambiguous; and a program with the statically bound function call, the program having a runtime library that determines at runtime when the statically bound function call becomes ambiguous and that converts the statically bound function call to a dynamically bound function call when it determines that the statically bound function call becomes ambiguous.

13. The data processing system of claim 12, wherein the compiler means is part of a Virtual Machine.

14. The data processing system of claim 12, wherein the runtime library converts the statically bound function call to a function call using in-line caching.

15. The data processing system of claim 12, wherein the compiler means determines that the function call is unambiguous by performing class hierarchy analysis.

16. The data processing system of claim 12, wherein the program is object-oriented.

17. The data processing system of claim 12, wherein the runtime library determines when the statically bound function call becomes ambiguous when a class is being loaded.

18. A computer-readable medium containing instructions for controlling a computer system to perform a method for compiling a computer program into object code, the computer program having functions containing code and function calls of the functions, the method comprising the steps of:

determining when a function call is unambiguous; and compiling the function call to generate object code that performs static binding when it is determined that the function call is unambiguous, and inserting a placeholder into the object code for an instruction to be inserted into the placeholder to switch to dynamic binding.

19. The computer-readable medium method of claim 18, wherein the step of determining includes performing class hierarchy analysis.

20. A computer-readable medium containing instructions for controlling a computer system to perform a method, the computer system having a computer program with statically bound function calls and dynamically bound function calls, the statically bound function calls invoking unambiguous functions, the dynamically bound function calls invoking ambiguous functions the method comprising the steps of:

determining whether a statically bound function call becomes ambiguous at runtime of the computer program; and converting the statically bound function call into a dynamically bound function call when it is determined that the statically bound function call becomes ambiguous, and backpatching the statically bound function call such that the conversion occurs without recompilation of the computer program.

21. The computer-readable medium of claim 20, wherein the converting step includes converting the statically bound function call into in-line caching.

22. The computer-readable medium of claim 20, wherein the method further includes determining when a class is being loaded and wherein the step of determining whether the statically bound function call becomes ambiguous includes determining whether the statically bound function call becomes ambiguous when it is determined that the class is being loaded.

23. The computer-readable medium of claim 22, wherein the class has class functions with names, wherein the statically bound function calls have names, and wherein the step of determining whether the statically bound function call becomes ambiguous further includes determining whether the name of one of the class functions is similar to the name of one of the statically bound function calls.

24. A computer-readable memory device encoded with computer code, the computer code including a function call to an unambiguous function, the function call compiled for static binding, the function call including:

a placeholder buffer reserving space such that when the unambiguous function becomes ambiguous, the placeholder is overwritten with an instruction to perform dynamic binding.

* * * * *